(12) United States Patent
Chang

(10) Patent No.: US 7,542,276 B2
(45) Date of Patent: Jun. 2, 2009

(54) PORTABLE COMPUTER WITH SUPPORT LEGS

(75) Inventor: Jen-Tsorng Chang, Taipei Hsien (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 0 days.

(21) Appl. No.: 11/943,497

(22) Filed: Nov. 20, 2007

(65) Prior Publication Data

US 2008/0174947 A1 Jul. 24, 2008

(30) Foreign Application Priority Data

Jan. 22, 2007 (CN) .......................... 2007 1 0200090

(51) Int. Cl.
*G06F 1/16* (2006.01)
*A47B 81/00* (2006.01)

(52) U.S. Cl. ..................................... 361/683; 312/223.2

(58) Field of Classification Search ......... 361/679–686, 361/724–727; 312/244, 902, 223.1, 223.2; 248/917, 918

See application file for complete search history.

(56) References Cited

U.S. PATENT DOCUMENTS

| 1,820,841 A * | 8/1931 | Soref .......................... 248/463 |
| 6,654,237 B1 * | 11/2003 | Lee ............................. 361/683 |
| 2005/0057896 A1 * | 3/2005 | Homer ........................ 361/686 |

\* cited by examiner

*Primary Examiner*—Jayprakash N Gandhi
*Assistant Examiner*—Nidhi Desai
(74) *Attorney, Agent, or Firm*—Frank R. Niranjan

(57) ABSTRACT

A portable computer includes a main body, a display screen device and two stand members. The main body has a top surface and a bottom surface. The display screen device is pivotally connected with the main body by a pivot. The bottom surface faces away from the display screen device. Each of the stand members includes a support leg, a connector member and a clasping tab. The connector member is arranged on the bottom surface. The support leg is pivotally coupled to the connector member between a deployed position and a stowed position. The clasping tab is formed on the bottom surface configured for clasping the supporting portion on the bottom surface when the support legs are in the stowed position. Two resisting members protrude outwardly from the connector member and are configured for retaining the support leg in the deployed position.

2 Claims, 5 Drawing Sheets

PORTABLE COMPUTER WITH SUPPORT LEGS

BACKGROUND

1. Field of the Invention

The present invention relates to portable computers and, particularly to a portable computer with support legs.

2. Description of Related Art

Portable computers (e.g. notebook or laptop) have many advantages, such as light weight, small volume, and excellent mobility. Each portable computer usually includes one or more microprocessors, disk drives, a power supply and other components. The processing speed of the microprocessors has increased dramatically in the recent years. Accordingly, heat produced by microprocessors, disk drives, power supplies and other components of the portable computers also increases, and challenges exist for computer manufacturers regarding dissipation of heat from portable computers. In use, a support or lap of a user directly touches a bottom surface of the portable computer. The direct contact between the supporting surface of the support or the lap of the user and the portable computer may cause heat accumulation therebetween and is adverse to heat dissipation from the portable computer. Additionally, the accumulated heat may make the users uncomfortable.

In order to overcome above problems, the bottom of conventional portable computers often employs four supporting posts located adjacent to four corners thereof. However, the supporting posts are generally made tab-shaped with a very short height, thus, when the portable computer is laid on the supporting surface or the laps of the user, the bottom surface is still likely to touch the support or the laps of the user. If the height of the supporting posts is increased, the portable computer will occupy a larger storage space, and thus lower its mobility.

What is needed, therefore, is a portable computer with support legs that is with excellent heat dissipation.

SUMMARY

In a first present embodiment of the present invention, a portable computer includes a main body, a display screen device and two stand members. The main body has a top surface and a bottom surface. The display screen device is pivotally connected with the main body by a pivot. The bottom surface of the main body faces away from the display screen device. Each of the stand members includes a support leg, a connector member and a clasping tab. The connector member is arranged on the bottom surface of the main body. The support leg is pivotally coupled to the connector member between a deployed position and a stowed position. The clasping tab is formed on the bottom surface of the main body configured for clasping the supporting portion on the bottom surface when the support legs are in the stowed position. Two resisting members protrude outwardly from the connector member and are configured for retaining the support leg in the deployed position.

In a second present embodiment of the present invention, a notebook computer includes a main body, a display screen device, and two support assemblies. The main body has a top face and a flat bottom surface. The display screen device is pivotally connected with the main body. The bottom surface of the main body faces away from the display screen device. The two support assemblies are arranged on the bottom surface. Each of the two support assemblies includes a support leg. The support leg is rotatable relative to the bottom surface between a deployed position where the support legs extend at an inclined angle relative to the bottom surface and a stowed position where the support legs extend substantially parallel to the bottom surface. The two support assemblies cooperatively function as support feet for elevating the main body such that the bottom surface is spaced apart a distance from a supporting surface when the main body is placed on the supporting surface for facilitating heat dissipation of the bottom surface of the main body.

Advantages and novel features will become more apparent from the following detailed description of the present solidifying apparatus for portable computer, when taken in conjunction with the accompanying drawings.

BRIEF DESCRIPTION OF THE DRAWINGS

Many aspects of the present portable computer with support legs can be better understood with reference to the following drawings. The components in the drawings are not necessarily drawn to scale, the emphasis instead being placed upon clearly illustrating the principles of the present portable computer with support legs. Moreover, in the drawings, like reference numerals designate corresponding parts throughout the several views.

DETAILED DESCRIPTION OF THE EMBODIMENT

Reference will now be made to the drawings to describe preferred embodiments of the present portable computer with support legs.

Figure 1:
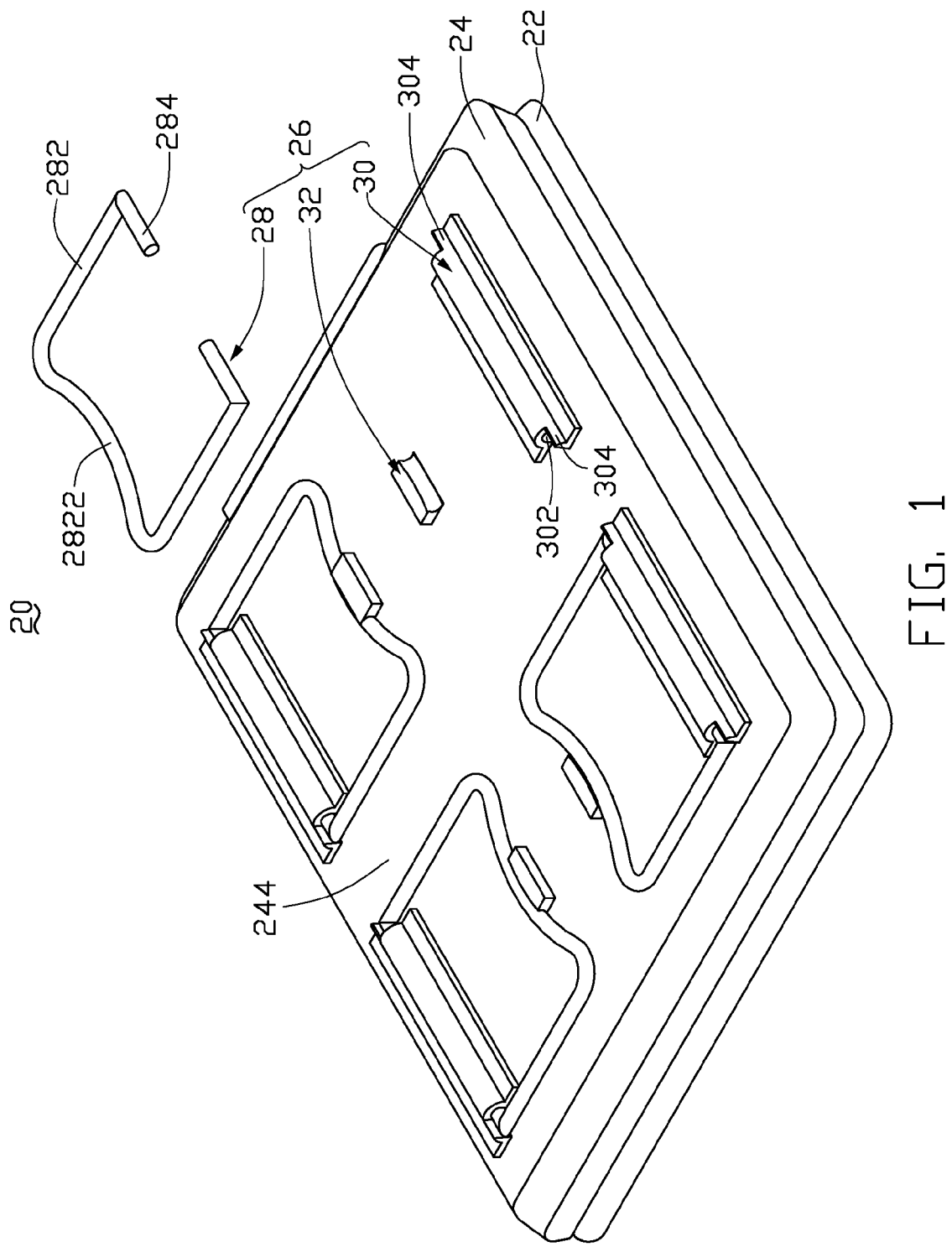
FIG. 1 is a schematic, perspective view of a portable computer with support legs in accordance with a first present embodiment, wherein one of the support legs is disassembled from the portable computer.
Figure 2:
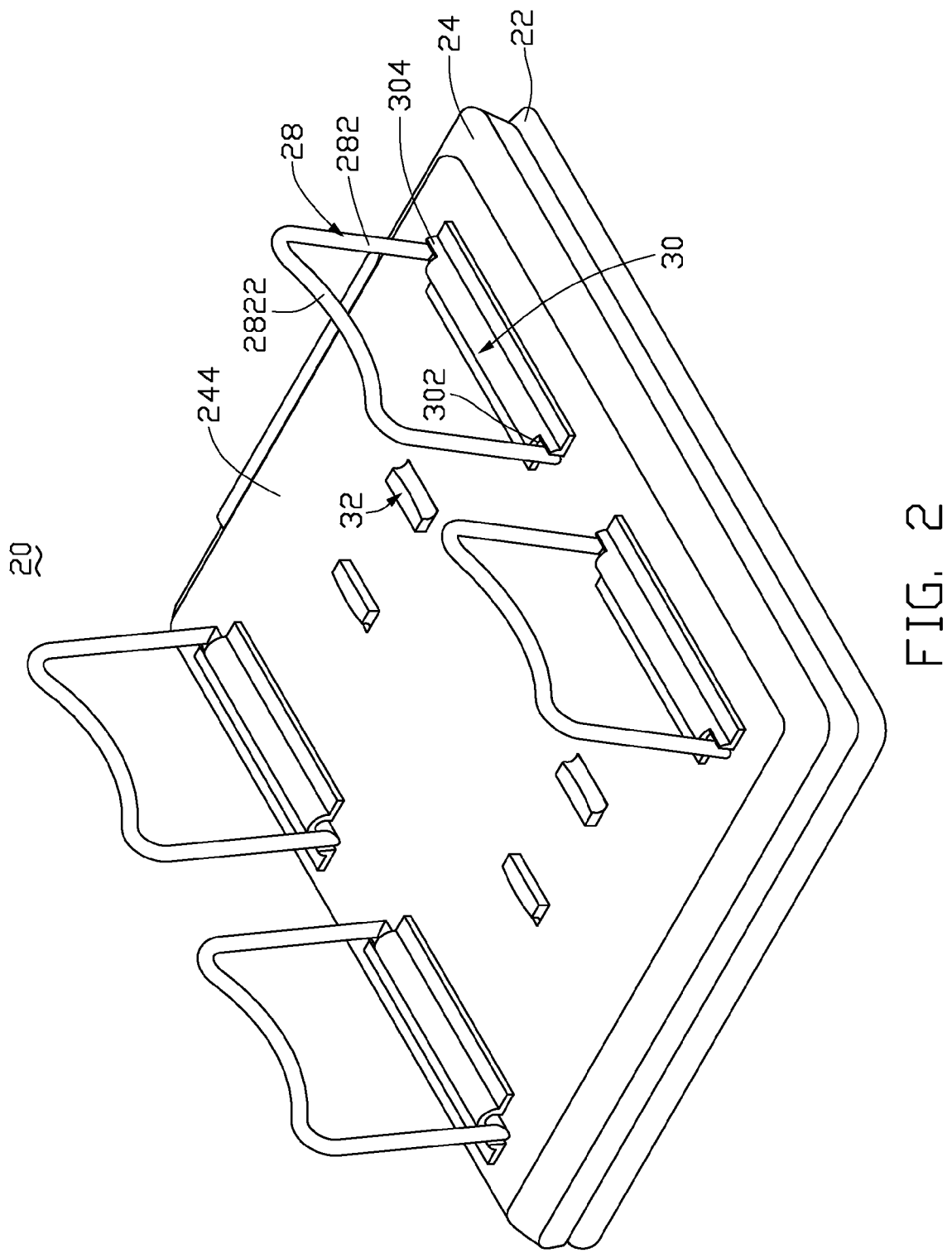
FIG. 2 is schematic, perspective view of the portable computer in FIG. 1 in fold state.
Figure 3:
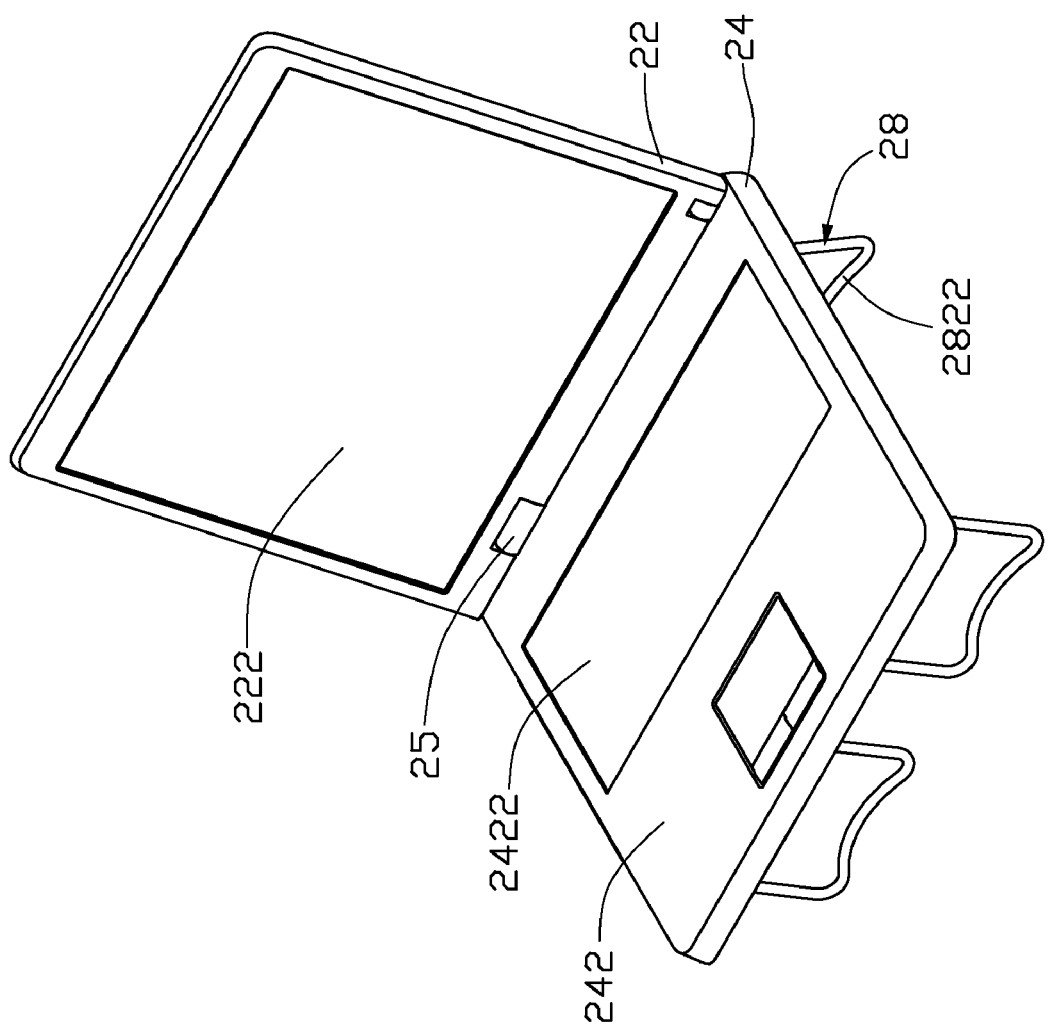
FIG. 3 is schematic, perspective view of the portable computer in FIG. 1 in unfolding state.

FIGS. 1 to 3 illustrate a portable computer 20 in accordance with a first present embodiment. The portable computer 20 includes a display screen device 22, a main body 24 and four support members 26. The display screen device 22 is pivotally connected with the main body 24 via a pivot 25. Generally, the display screen device 22 includes a display screen 222, e.g., an LCD panel. The main body 24 has a top face 242 and a bottom surface 244 opposite the top face 242. When the portable computer 20 is in a fold state, the top face 242 of the main body 24 faces the display screen 222 and the bottom surface 244 faces away from the display screen device 22. The four support members 26 are structured on the bottom surface 244 of the main body 24.

The main body 24 includes a main frame (not labeled) and hardware (not shown), such as a CPU, memories, hard disks etc., installed in the main frame 242. An input device 2422, such as a keyboard, is embedded in the top face 242. The input device 2422 is configured for inputting words, figures or other kinds of information displayed by the display screen device 22.

Each of the support members 26 includes a support leg 28, a connector member 30 and a clasping tab 32. The connector member 30 and the clasping tab 32 are attached to or integrally connected with the bottom surface 244 of the main body 24. The support leg 28 is pivotally coupled to the connector member 30. The clasping tab 32 is used for clasping the support leg 28 in order to prevent the support leg 28 from turning.

The support leg 28 includes a U-shaped support portion 282 and two pivot pins 284 extending from the two distal ends of the support portion 282 respectively. The support portion 282 includes a foot portion 2822 configured for contacting with a supporting surface such as a user's lap or a desk. The foot portion 2822 is arc-shaped such that it can be mated to the user's lap when the portable computer 20 is placed on the lap of the user. The two pivot pins 284 are configured to pivotally couple to the connector member 30 between a deployed position and a stowed position. The deployed position is where the support leg 28 extends at an inclined angle relative to the bottom surface 244, and the stowed position is where the support leg 28 extends substantially parallel to the bottom surface 244.

The connector member 30 defines two pivot holes 302 corresponding to the two pivot pins 284. The pivot pins 284 are respectively inserted into the pivot holes 302. The pivot pins 284 can rotate relative to the connector member 30. Two resisting members 304 protrude outwardly from the connector member 30 and are parallel with the extending direction of the pivot holes 302. The resisting members 304 are configured for retaining the support leg 28 in the deployed position. It is to be understood that the pivot pins 284 also can define two pivot holes therein, respectively. Correspondingly, the connector member 30 also can include two pivot pins inserted into the corresponding pivot holes defined in the pivot pins 284.

The clasping tab 32 is attached to the bottom surface 244 by soldering. The clasping tab 32 is configured for clasping the support leg 28 in the stowed position by pressing the foot portion 2822, thereby preventing the support leg 28 from turning. The clasping tab 32 also can be fixed on the bottom surface 244 by riveting, screw connection, etc.

Two of the support members 26 are close to the pivot 25 and another two thereof away from the pivot 25. The extending directions corresponding to the four pivot holes 302 are parallel with the pivot 25. Referring to FIG. 1, when the portable computer 20 is not in use, the support legs 28 are folded onto the bottom surface 244 of the portable computer 20 and clasped by the clasping tab 32 in the stowed position. Referring to FIG. 3, when the portable computer 20 is in use, the feet portion 2822 contact the lap of the user, thus the portable computer 20 is placed on the lap of the user.

In this present embodiment, the portable computer 20 has four support legs 28 arranged on the bottom surface 244 thereof. When the portable computer 20 is in use, the support legs 28 are in the deployed position and each of the support portions 282 contacts the lap of the user, thus the main body 24 is elevated such that the bottom surface 244 is spaced apart a distance from the lap of the user. The space allows for the adequate ventilation and heat dissipation for the portable computer 20. When the portable computer 20 is not in use, the support legs 28 are in the stowed position on the bottom surface 244.

Figure 4:
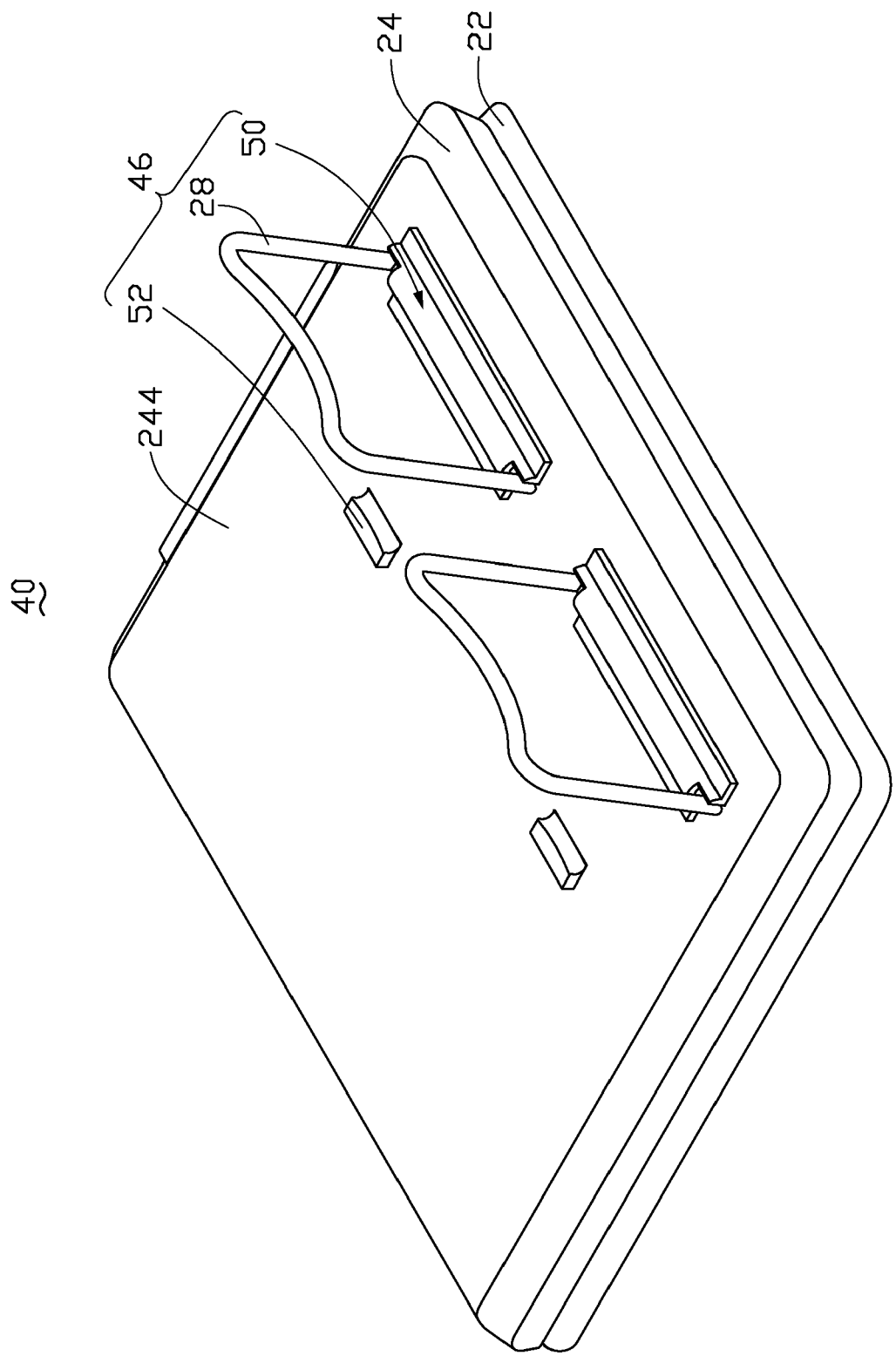
FIG. 4 is schematic, perspective view of a portable computer in fold state in accordance with a second preferred embodiment.
Figure 5:
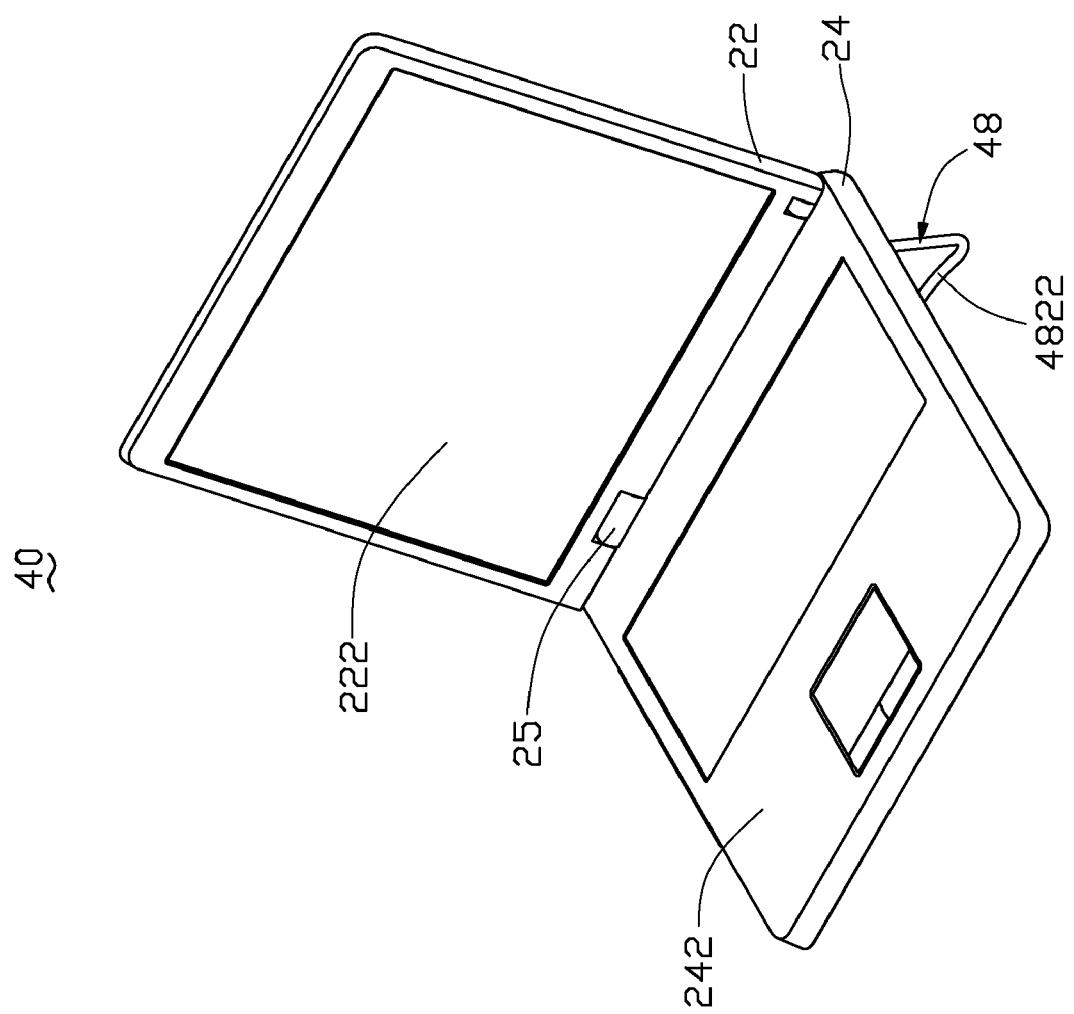
FIG. 5 is schematic, perspective view of the portable computer in FIG. 4 in unfolding state.

Referring to FIGS. 4 and 5, a portable computer 40 is illustrated in accordance with a second embodiment. Compared to the portable computer 20 of the first embodiment, the distinguishing features are that two support members 46 are arranged on the bottom surface 244 of the portable computer 40 and close to the pivot 25. The support member 46 includes a support leg 48, a connector member 50 and a clasping tab 52 which are identical to the support leg 28, the connector member 30 and the clasping tab 32 of the first embodiment. In use, two feet portions 4822 of the corresponding support legs 28 are in the deployed positions and contact the lap of the user separately, thus the portable computer 40 is placed on the lap of the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A notebook computer comprising:
   a main body having a top face and a flat bottom surface;
   a display screen device pivotally connected with the main body, the bottom surface of the main body facing away from the display screen device; and
   two support assemblies arranged on the bottom surface, each of the two support assemblies comprising a support leg and a connecting member holding the support leg in place at the bottom surface, the support leg rotatable relative to the bottom surface between a deployed position where the support leg extends at an inclined angle relative to the bottom surface and a stowed position where the support leg extends substantially parallel to the bottom surface, the support legs cooperatively functioning as support feet for elevating the main body such that the bottom surface is spaced apart a distance from a supporting surface when the main body is placed on the supporting surface for facilitating heat dissipation of the bottom surface of the main body, the support leg of each support assembly comprising a support portion, the support portion comprising an arc-shaped foot portion, the support leg being pivotally coupled to the connecting member, the arc-shaped foot portion being configured for coming into contact with the supporting surface, a middle section of the arc-shaped foot portion being curved toward the connecting member, the support leg of each support assembly further comprising two pivot pins extending from the two ends of the support portion respectively, free ends of the pivot pins facing toward each other, two pivot holes being defined in two opposite ends of the connecting member, and the free ends of the pivot pins being pivotably received in the respective pivot holes.

2. The notebook computer as described in claim 1, wherein the support portion is a generally U-shaped rod.

* * * * *